United States Patent
Takabe

(10) Patent No.: US 8,496,254 B2
(45) Date of Patent: Jul. 30, 2013

(54) BOOT FOR CONSTANT VELOCITY UNIVERSAL JOINT

(75) Inventor: Shinichi Takabe, Iwata (JP)

(73) Assignee: NTN Corporation, Osaka (JP)

( * ) Notice: Subject to any disclaimer, the term of this patent is extended or adjusted under 35 U.S.C. 154(b) by 383 days.

(21) Appl. No.: 12/865,495

(22) PCT Filed: Jan. 14, 2009

(86) PCT No.: PCT/JP2009/050338
§ 371 (c)(1),
(2), (4) Date: Jul. 30, 2010

(87) PCT Pub. No.: WO2009/101831
PCT Pub. Date: Aug. 20, 2009

(65) Prior Publication Data
US 2010/0320702 A1 Dec. 23, 2010

(30) Foreign Application Priority Data
Feb. 13, 2008 (JP) ................................. 2008-031975

(51) Int. Cl.
*F16L 1/26* (2006.01)
(52) U.S. Cl.
USPC ......................................... 277/636; 277/634
(58) Field of Classification Search
USPC ......................................... 277/634, 636, 637
See application file for complete search history.

(56) References Cited

U.S. PATENT DOCUMENTS

| | | | |
|---|---|---|---|
| 6,227,748 B1 | 5/2001 | Hayward et al. | |
| 7,264,549 B2 * | 9/2007 | Ohshita et al. | 464/175 |
| 7,347,787 B2 * | 3/2008 | Ohshita et al. | 464/173 |
| 7,753,380 B2 * | 7/2010 | Kumazaki et al. | 277/636 |
| 2003/0047883 A1 * | 3/2003 | Imazu et al. | 277/634 |

FOREIGN PATENT DOCUMENTS

| | | |
|---|---|---|
| EP | 0 873 484 | 10/1998 |
| JP | 09-096318 | 4/1997 |
| JP | 2000-503372 | 3/2000 |
| WO | 97/26473 | 7/1997 |
| WO | WO 2008139794 A1 * | 11/2008 |

OTHER PUBLICATIONS

International Search Report issued Feb. 10, 2009 in International (PCT) Application No. PCT/JP2009/050338.
International Preliminary Report on Patentability and Written Opinion of the International Searching Authority issued Apr. 12, 2012 in International (PCT) Application No. PCT/JP2009/050338.

* cited by examiner

*Primary Examiner* — Gilbert Lee
(74) *Attorney, Agent, or Firm* — Wenderoth, Lind & Ponack, L.L.P.

(57) ABSTRACT

Provided is a boot for a constant velocity universal joint capable of being properly engaged with an outer joint member of a constant velocity universal joint and capable of increasing durability thereof. Over a shoulder portion (5) and a root portion (13) of a boot (1) for a constant velocity universal joint according to the present invention, there are formed a circular arc portion (14) adjacent to a large diameter portion (2) and having an axial sectional shape protruding radially outward and a linear portion (15) adjacent to the circular arc portion (14) and having a linear axial sectional shape. An innerperipheral surface (16) of the linear portion (15) is brought into contact with an opening end portion (17) of an outer joint member (7) of a constant velocity universal joint (6) such that a thickness from the circular arc portion (14) to the linear portion (15) is uniform.

5 Claims, 4 Drawing Sheets

BOOT FOR CONSTANT VELOCITY UNIVERSAL JOINT

TECHNICAL FIELD

The present invention relates to a boot to be mounted, for example, to a constant velocity universal joint in a power transmission mechanism of an automobile.

BACKGROUND ART

As is well known, for the purpose of preventing intrusion of foreign matters such as dust into a joint and preventing leakage of a grease sealed inside the joint, a boot is mounted, for example, to a constant velocity universal joint incorporated into a power transmission mechanism of an automobile.

An example of the boot of this type is illustrated in FIG. 4. This boot 31 mainly includes a large diameter portion 32, a small diameter portion 33, a bellows portion 34, and a shoulder portion 35. Meanwhile, a constant velocity universal joint 36 mainly includes an outer joint member 37, an inner joint member (not shown), and a torque transmitting member (not shown) for transmitting torque being interposed between the outer joint member 37 and the inner joint member. The large diameter portion 32 of the boot 31 is engaged on the opening end side of the outer joint member 37 of the constant velocity universal joint 36, and tightened with use of a boot band 38 so as to be fixed. The small diameter portion 33 of the boot 31 is engaged with a shaft 39 coupled to the inner joint member of the constant velocity universal joint 36, and tightened with use of a boot band 40 so as to be fixed.

Incidentally, when the large diameter portion 32 of the boot 31 is engaged with the outer joint member 37 of the constant velocity universal joint 36, there is a risk in that the large diameter portion 32 moves past a predetermined position of the outer joint member 37 illustrated in FIG. 4, to which the large diameter portion 32 is fixed. To deal with this problem, in the invention according to an embodiment of Patent Document 1, over the shoulder portion and the bellows portion of the boot, the upright portion is formed which forms an angle of 85 to 90 degrees with respect to an axial direction, or desirably, an angle of about 90 degrees. With this structure, when the large diameter ring portion is engaged with the housing portion, the upright portion is engaged with the housing portion, whereby the large diameter ring portion is engaged with the housing portion at a predetermined position.

[Patent Document 1] JP 09-96318 A

DISCLOSURE OF THE INVENTION

Problem to be Solved by the Invention

However, in the shoulder portion of the boot according to the embodiment of Patent Document 1, the portion connected to the large diameter ring portion has a thin thickness, and the portion connected to the upright portion has the chamfered portion formed on the outer peripheral surface thereof. As a result, the thickness of the shoulder portion is nonuniform. Further, the shoulder portion has the outer shape protruding radially outward. The nonuniformity in thickness and the outer shape of the shoulder portion cause stress concentration upon the collision of the foreign matters (stones, for example) from the exterior and owing to the boot deformed as a result of the operation of the constant velocity universal joint, whereby the durability may be deteriorated.

In view of this, under the above-mentioned circumstances, the present invention has an object to provide a boot for a constant velocity universal joint capable of being properly engaged with an outer joint member of a constant velocity universal joint and capable of increasing durability thereof.

Means for Solving the Problem

In order to achieve the above-mentioned object, a first aspect of the invention provides a boot for a constant velocity universal joint, provided with:

a large diameter portion fitted to an outer joint member of a constant velocity universal joint including
  the outer joint member,
  an inner joint member, and
  a torque transmitting member interposed between the outer joint member and the inner joint member, for transmitting torque;

a small diameter portion fitted to a shaft coupled to the inner joint member;

a bellows portion connected to a side of the large diameter portion of the small diameter portion, alternately including a peak portion and a root portion which respectively have a peak shape and a root shape radially outward, and forming a root portion on a side which is closest to the large diameter portion; and a shoulder portion for connecting the large diameter portion and the root portion on the side which is closest to the large diameter portion to each other, in which: in a state where the boot for a constant velocity universal joint is fitted to the constant velocity universal joint and the shaft at an operating angle of 0 degrees, a circular arc portion and a linear portion are formed over the shoulder portion and the root portion on the side which is closest to the large diameter portion, the circular arc portion being adjacent to the large diameter portion and having an axial sectional shape protruding radially outward, the linear portion being adjacent to the circular arc portion and having a linear axial sectional shape; and an inner peripheral surface of the linear portion is in contact with an opening end portion of the outer joint member, and a thickness from the circular arc portion to the linear portion is uniform.

The description "at an operating angle of 0 degrees" used herein includes a case where the operating angle can be regarded as substantially 0 degrees while the operating angle is not strictly 0 degrees owing to a minute angle difference and the like (the same in the following).

Further, the description "adjacent" used herein represents a connection without any intermediate portion (the same in the following).

Still further, the description "circular arc shape" used herein includes one which can be regarded as a substantial circular arc shape while being not strictly a circular arc shape owing to minute shape difference and the like (the same in the following). The same applies to the descriptions "linear" and "uniform" (the same in the following).

According to the first aspect of the invention, the circular arc portion has a circular arc shape and an axial sectional shape protruding radially outward, thereby producing a stress dispersion effect which is effective on the external force. Further, a gap is formed between an inner peripheral surface of the circular arc portion and an outer peripheral surface of the outer joint member, and the thickness of the circular arc portion is uniform. As a result, a cushion effect is substantially uniformly produced at any portion of the circular arc portion. Accordingly, in the case of being collided against the foreign matters such as stones from the exterior, the circular arc portion is less liable to be damaged. Further, the thickness of from the circular arc portion to the linear portion is uniform, and hence it is possible to prevent the stress from concentrating on particular portions upon the collision of the foreign matters from the exterior and owing to the boot deformed as a result of the operation of the constant velocity universal joint. For those reasons, the durability of the circular arc portion and the linear portion, eventually, of the boot is increased. Further, the circular arc portion has a circular arc shape and an axial sectional shape protruding radially outward, and the thickness of the circular arc portion is uniform. Thus, in the case where the constant velocity universal joint forms an operating angle, the circular arc portion functions as a bellows.

Further, according to the first aspect of the invention, the inner peripheral surface of the linear portion is brought into contact with the opening end portion of the outer joint member. With this structure, when the large diameter portion is fitted to the outer joint member, the inner peripheral surface of the linear portion is brought into contact with the opening end portion of the outer joint member, whereby the large diameter portion is prevented from moving past a predetermined position of the outer joint member. As a result, the large diameter portion can be engaged with the outer joint member at the predetermined position.

According to a second aspect of the invention, in the first aspect of the invention, the axial sectional shape of the circular arc portion is formed into a semicircular arc shape protruding radially outward.

The description "semicircle" used herein includes one which can be regarded as a substantial semicircle even when the central angle thereof is somewhat deviated from 180 degrees (the same in the following).

According to the second aspect of the invention, the operational effect of the circular arc portion described in the first aspect of the invention can be more remarkably obtained.

According to a third aspect of the invention, in the first or second aspects of the invention, a minimum inner diameter of the root portion on the side which is closest to the larger diameter portion is set so as to fall within a range of from 93% to 100% with respect to a maximum diameter of a groove for keeping the torque transmitting member at an opening end of the outer joint member.

The description "maximum diameter of a groove" used herein is twice as large as the maximum one of the distances between the inner surface of the groove and the axial line of the outer joint member (the same in the following).

According to a third aspect of the invention, the function of the root portion as a root portion on the side which is closest to the large diameter portion is not impaired, and the boot can be compactified. Further, even in the case where the constant velocity universal joint forms a high operating angle, the root portion on the side which is closest to the large diameter portion is prevented from being caught between the outer joint member and the shaft. Accordingly, the root portion on the side which is closest to the large diameter portion is less liable to be damaged, and the durability thereof is increased.

According to a fourth aspect of the invention, in any of the first through third aspects of the invention, the inner peripheral surface of the linear portion is inclined with respect to a radial direction at an angle higher than 0 degrees and equal to or lower than 10 degrees.

According to the fourth aspect of the invention, in the case where the constant velocity universal joint forms a high operating angle, particularly, in a state where the boot is axially compressed in the plunging constant velocity universal joint, the root portion on the side which is closest to the large diameter portion is prevented from being caught between the outer joint member and the shaft. With this structure, the root portion on the side which is closest to the large diameter portion is less liable to be damaged, and the durability thereof is increased. Further, it is possible to reduce the axial distance of the linear portion, to thereby axially compactify the boot.

According to a fifth aspect of the invention, in any of the first through fourth aspects of the invention, a thermoplastic polyester elastomer is used as a material thereof According to the fifth aspect of the invention, the same operational effect described above can be obtained more effectively in a boot for a constant velocity universal joint made of a thermoplastic polyester elastomer.

According to a sixth aspect of the invention, in any of the first through fifth aspects of the invention, the constant velocity universal joint is a plunging constant velocity universal joint.

According to the sixth aspect of the invention, the same operational effect described above can be obtained more effectively in a boot for a plunging constant velocity universal joint.

According to a seventh aspect of the invention, in the sixth aspect of the invention, the plunging constant velocity universal joint is a double offset type constant velocity universal joint provided with the torque transmitting members, the number of which is three to ten.

In the seventh aspect of the invention, the same operational effect described above can be obtained more effectively with use of a boot for the double offset type constant velocity universal joint provided with the torque transmitting members, the number of which is three to ten.

Effects of the Invention

According to the present invention, there can be provided the boot for a constant velocity universal joint capable of being properly engaged with the outer joint member of the constant velocity universal joint and capable of increasing durability thereof.

DETAILED DESCRIPTION OF THE INVENTION

In the following, the best mode for carrying out the present invention is described.

Figure 1:
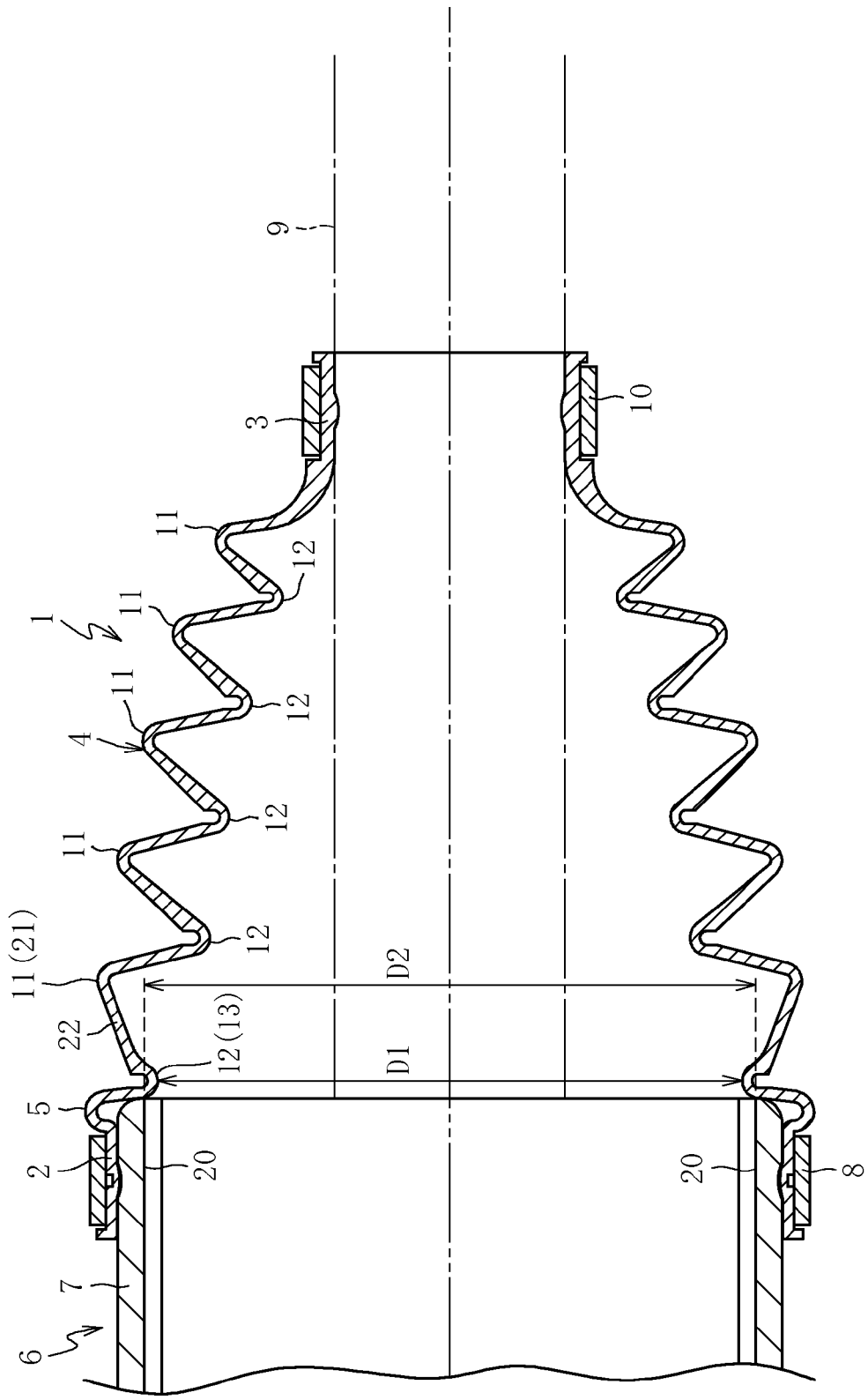
FIG. 1 is an axial sectional view illustrating a state where a boot for a constant velocity universal joint according to an embodiment of the present invention is fitted to a constant velocity universal joint and a shaft.

FIG. 1 illustrates a state where a boot for a constant velocity universal joint according to an embodiment of the present invention is fitted to a constant velocity universal joint and a shaft at an operating angle of 0 degrees. Normally, the boot for a constant velocity universal joint is fitted while being compressed or extended. In this state, for the sake of convenience, it is assumed that the boot for a constant velocity universal joint is not substantially subjected to the axial force owing to the constant velocity universal joint and the shaft.

This boot 1 mainly includes a large diameter portion 2, a small diameter portion 3, a bellows portion 4, and a shoulder portion 5. In this embodiment, as a constant velocity universal joint 6, a double offset type constant velocity universal joint serving as a plunging constant velocity universal joint is used. The constant velocity universal joint 6 mainly includes an outer joint member 7, an inner joint member (not shown), and a torque transmitting member (not shown) for transmitting torque while interposed between the outer joint member 7 and the inner joint member. The torque transmitting member includes a ball. While not particularly limited, the number of the balls is preferably three to ten.

The large diameter portion 2 of the boot 1 is engaged at a predetermined position on the opening end side of the outer joint member 7 of the constant velocity universal joint 6, and tightened with use of a boot band 8 so as to be fixed. The small diameter portion 3 of the boot 1 is engaged at a predetermined position of a shaft 9 coupled to the inner joint member of the constant velocity universal joint 6, and tightened with use of a boot band 10 so as to be fixed.

The bellows portion 4 is connected to the side of the large diameter portion 2 of the small diameter portion 3 and alternately includes a peak portion 11 and a root portion 12 which respectively have a peak shape and a root shape radially outward. The side which is closest to the large diameter portion 2 forms a root portion. The shoulder portion 5 connects the large diameter portion 2 and the root portion 12 on the side which is closest to the large diameter portion 2 (hereinafter, this root portion is referred to as root portion 13) to each other.

Figure 2:
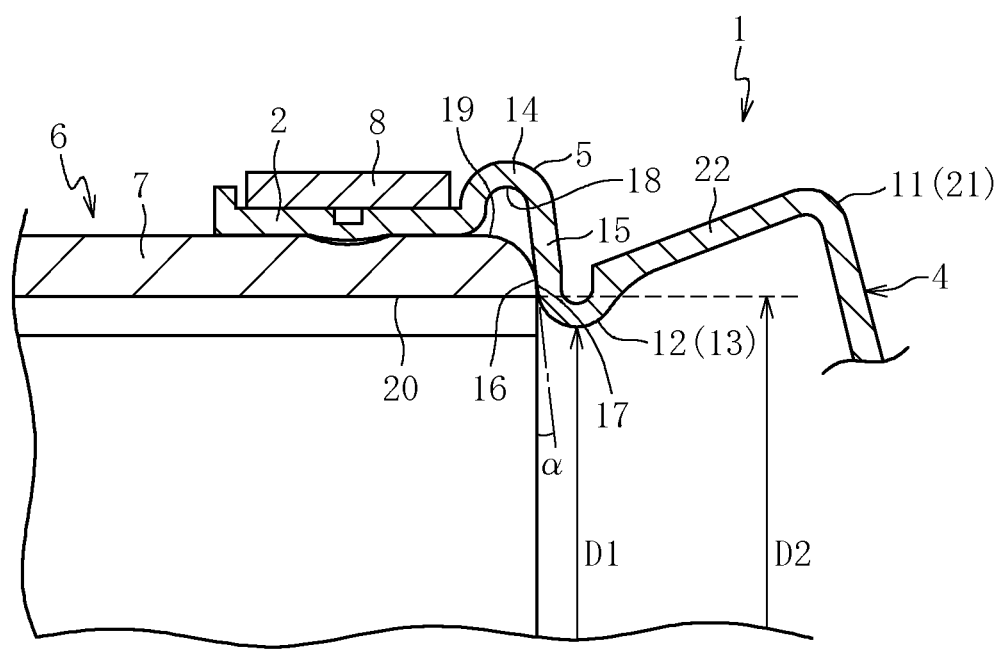
FIG. 2 is an enlarged view of the main portion of FIG. 1.

As specifically illustrated in FIG. 2, over the shoulder portion 5 and the root portion 13, there are formed a circular arc portion 14 adjacent to the large diameter portion 2 and having a circular arc shape and an axial sectional shape protruding radially outward, and a linear portion 15 adjacent to the circular arc portion 14 and having a linear axial sectional shape. In this embodiment, while including a semicircular arc shape, the circular arc shape of the circular arc portion 14 is not limited thereto, and may include a circular arc shape of a circle in which a central angle higher than and lower than 180 degrees is formed. However, the circle in which a central angle of 180 degrees is formed, that is, which has a shape as similar as possible to a semicircular arc shape may produce a larger operational effect described later of the circular arc portion 14. An inner peripheral surface 16 of the linear portion 15 has a linear axial profile line, and is brought into contact with an opening end portion 17 of the outer joint member 7. The thickness from the circular arc portion 14 to the linear portion 15 is uniform.

The circular arc portion 14 has a circular arc shape and an axial sectional shape protruding radially outward, thereby producing a stress dispersion effect which is effective on the external force. Further, a gap is formed between an inner peripheral surface 18 of the circular arc portion 14 and an outer peripheral surface 19 of the outer joint member, and the thickness of the circular arc portion 14 is uniform. As a result, a cushion effect is substantially uniformly produced at any portion of the circular arc portion 14. Accordingly, in the case of being collided against the foreign matters such as stones from the exterior, the circular arc portion 14 is less liable to be damaged. Further, the thickness from the circular arc portion 14 to the linear portion 15 is uniform, and hence it is possible to prevent the stress from concentrating on particular portions upon collision of the foreign matters from the exterior and owing to the boot 1 deformed as a result of the operation of the constant velocity universal joint 6. For those reasons, the durability is increased in the circular arc portion 14 and the linear portion 15, eventually, in the boot 1. Further, the circular arc portion 14 has a circular arc shape and an axial sectional shape protruding radially outward, and the thickness of the circular arc portion 14 is uniform. Thus, in the case where the constant velocity universal joint 6 forms an operating angle, the circular arc portion 14 functions as a bellows.

It is desirable that the outer diameter of the circular arc portion 14 be set to fall within the range of from 102% to 110% with respect to the outer diameter of the outer joint member, particularly, the range of from 102% to 107% with respect thereto. In the case where the outer diameter of the circular arc portion 14 is set to be smaller than 102% with respect thereto, the gap is reduced between the inner peripheral surface 18 of the circular arc portion 14 and the outer peripheral surface 19 of the outer joint member 7. As a result, the cushioning properties are deteriorated, and hence in the case of being collided against the foreign matters from the exterior, the circular arc portion 14 is liable to be damaged. In the case where the outer diameter of the circular arc portion 14 is set to be larger than 110% thereof, the compactness of the boot 1 is lost.

It is desirable that the radius of the inner peripheral surface 18 of the circular arc portion 14 in the axial section fall within the range of from 1 mm to 5 mm, particularly, 1 mm to 3 mm. In the case where the radius is shorter than 1 mm, the gap is reduced between the inner peripheral surface 18 of the circular arc portion 14 and the outer peripheral surface 19 of the outer joint member 7. As a result, the cushioning properties are deteriorated, and hence in the case of being collided against the foreign matters from the exterior, the circular arc portion 14 is liable to be damaged. In the case where the radius is longer than 5 mm, the compactness of the boot 1 is lost.

The inner peripheral surface 16 of the linear portion 15 is brought into contact with the opening end portion 17 of the outer joint member 7. In this context, when the large diameter portion 2 is fitted to the outer joint member 7, the inner peripheral surface 16 of the linear portion 15 is brought into contact with the opening end portion 17 of the outer joint member 7, whereby the large diameter portion 2 is prevented from moving past a predetermined position of the outer joint member 7, at which the large diameter portion 2 is fixed. Therefore, the large diameter portion 2 can be easily engaged to be fixed at the predetermined position of the outer joint member 7.

It is desirable that an inclination angle $\alpha$ with respect to the radial direction of the linear portion 15 (equal to direction along the opening end surface of outer joint member 7, in this embodiment) fall within the range higher than 0 degrees and equal to or lower than 10 degrees, particularly, the range higher than 0 degrees and equal to or lower than 5 degrees. In the case where the inclination angle $\alpha$ is equal to or lower than 0 degrees, in the case where the constant velocity universal joint 6 forms an operating angle while the boot 1 is axially compressed and the root portion 13 is moved inside the outer joint member 7, the root portion 13 is liable to be caught between the outer joint member 7 and the shaft 9. With this structure, the root portion 13 is liable to be damaged, thereby deteriorating the durability. In the case where the inclination angle $\alpha$ is higher than 10 degrees, the axial distance of the linear portion 15 is increased, and hence the axial compactness of the boot 1 is lost.

It is desirable that a minimum inner diameter $D1$ of the root portion 13 be set to fall within the range of from 93% to 100% with respect to a maximum diameter $D2$ of a groove 20 for keeping balls as the torque transmitting members at the opening end of the outer joint member 7. In the case where the minimum inner diameter D1 is set to be smaller than 93% with respect thereto, when the constant velocity universal joint 6 forms an operating angle while the boot 1 is axially compressed and the root portion 13 is moved inside the outer joint member 7, the root portion 13 is liable to be caught between the outer joint member 7 and the shaft 9. With this structure, the root portion 13 is liable to be damaged, thereby deteriorating the durability. In the case where the minimum inner diameter D1 is set to be larger than 100% thereof, the function of the root portion 13 as a root portion is liable to be impaired, and the compactness of the boot 1 is lost.

It is desirable that the boot 1 be made of a thermoplastic polyester elastomer, and that the material of the boot 1 have a type D durometer hardness according to JIS K 6253 of 38 to 55, particularly, 45 to 55. In the case where the material has the type D durometer hardness described above, when the large diameter portion 2 is fitted to the outer joint member 7, the effect is significant which is obtained through bringing the inner peripheral surface 16 of the linear portion 15 into contact with the opening end portion 17 of the outer joint member 7. That is, the effect is significant which is obtained through prevention of the large diameter portion 2 from moving past a predetermined position of the outer joint member 7, at which the large diameter portion 2 is fixed, and with which the large diameter portion 2 is engaged to be fixed at the predetermined position of the outer joint member 7.

Figure 3:
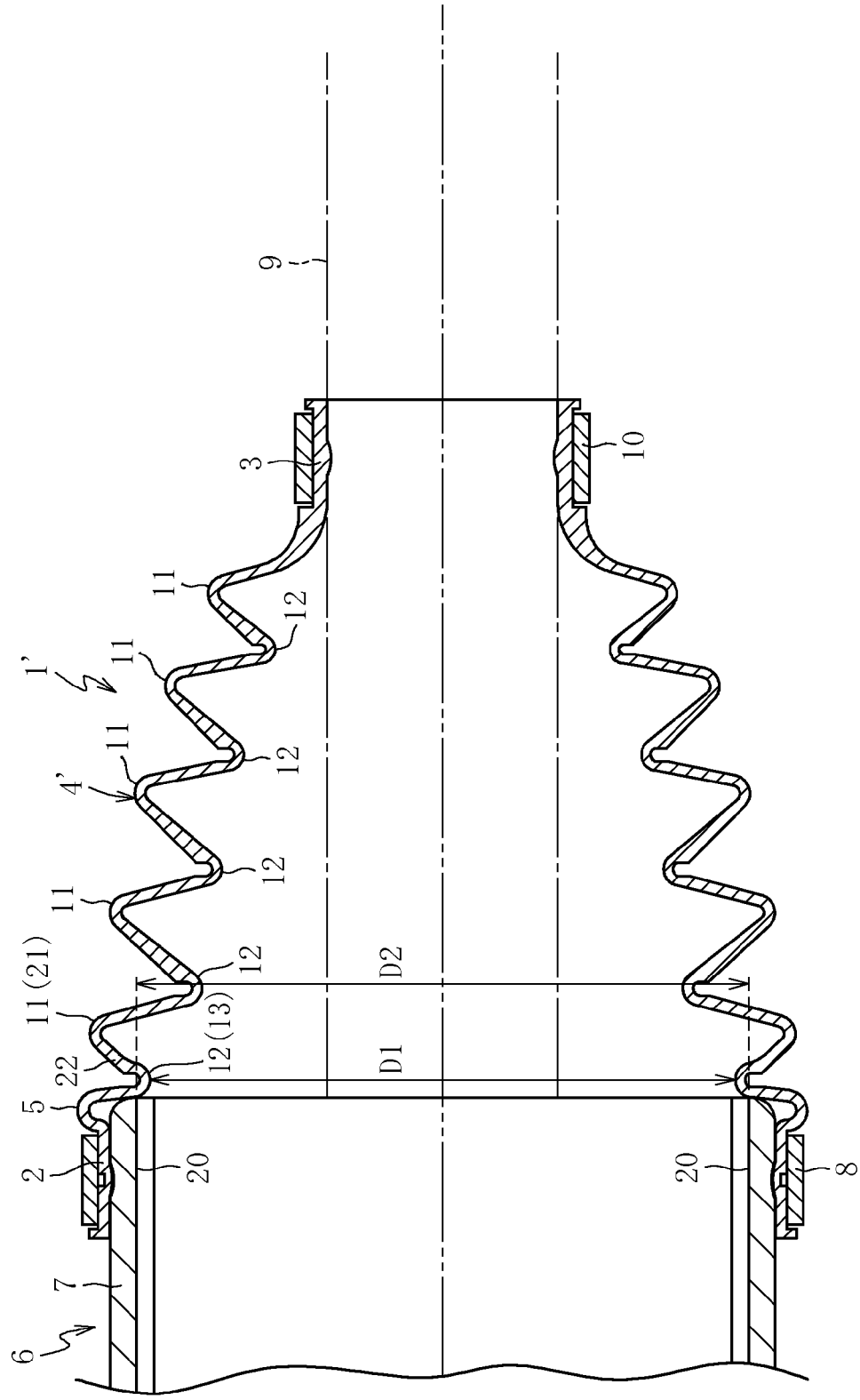
FIG. 3 is an axial sectional view illustrating a state where a boot for a constant velocity universal joint according to another embodiment of the present invention is fitted to a constant velocity universal joint and a shaft.
Figure 4:
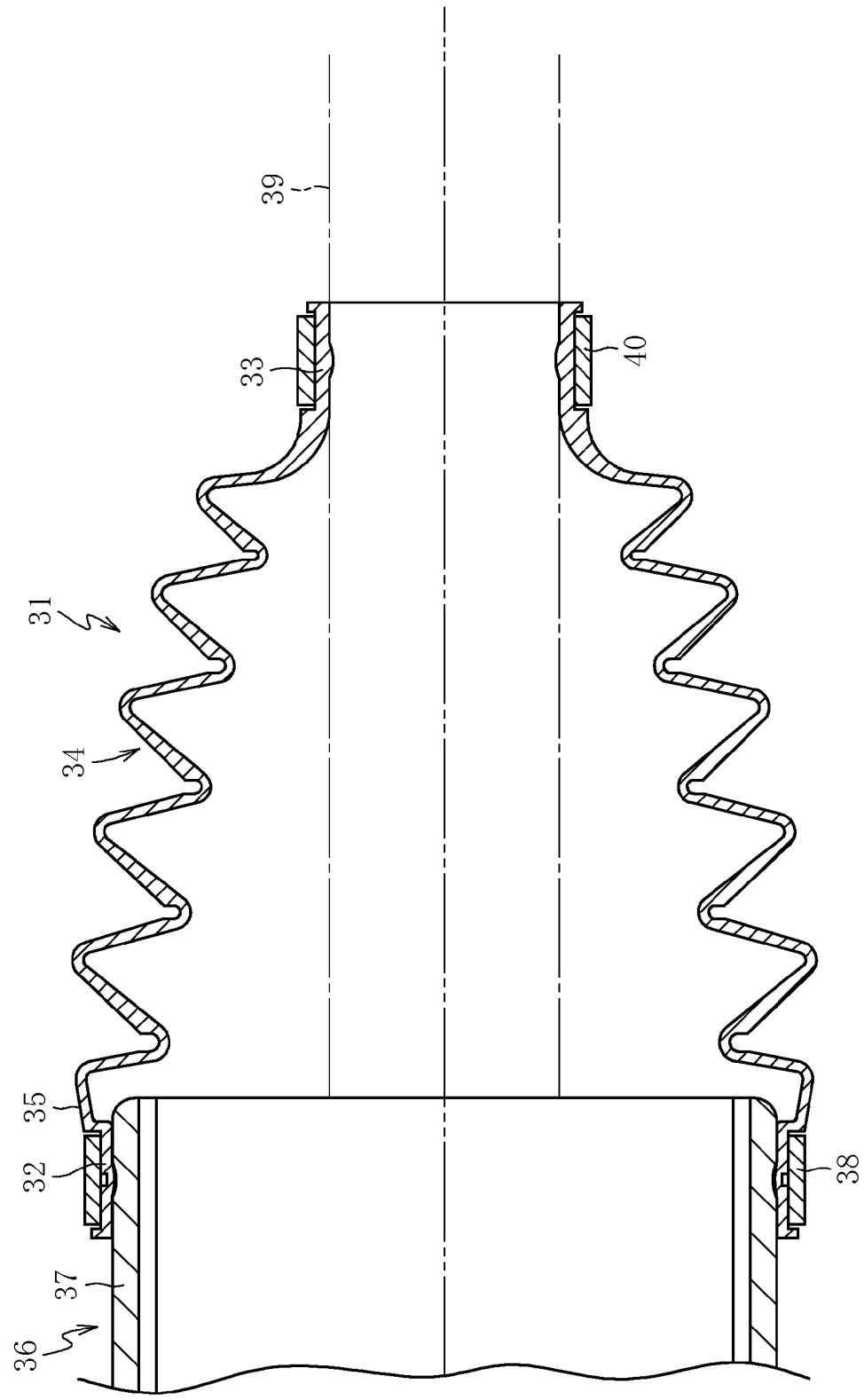
FIG. 4 is an axial sectional view illustrating a state where a conventional boot for a constant velocity universal joint is fitted to a constant velocity universal joint and a shaft.

Note that, as the shape of the bellows portion 4 other than the circular arc portion 14 and the linear portion 15, an arbitrary shape is applicable. For example, a bellows portion 4' of a boot 1' illustrated in FIG. 3 may be applied. Note that, as in the case of the boot 1 illustrated in FIG. 1, the boot 1' illustrated in FIG. 3 is in a state of being fitted to the constant velocity universal joint 6 and the shaft 9 at an operating angle of 0 degrees. Normally, the boot for a constant velocity universal joint is fitted while compressed or extended. In this state, for the sake of convenience, it is assumed that the boot 1' is not substantially subjected to the axial force owing to the constant velocity universal joint 6 and the shaft 9. The boot 1' is different from the boot 1 in that the length of a portion 22 is short between the root portion 13 and the peak portion 11 on the side which is closest to the large diameter portion 2 (hereinafter, this peak portion is referred to as peak portion 21). With this structure, the boot 1' is compactified in the axial size with respect to the boot 1.

In the above-mentioned embodiment, a plunging constant velocity universal joint is used as the constant velocity universal joint 6. In the plunging constant velocity universal joint, a thickness of the groove portion at the opening end of the outer joint member is thinner than that of a fixed-type constant velocity universal joint, and further, the shaft is moved in the inner direction of the outer joint member in some cases. As a result, in the conventional boot, the shaft is moved in the inner direction of the outer joint member. Thus, the boot is subjected to the axial force so as to be compressed, and the root portion on the side which is closest to the large diameter portion is moved inside the outer joint member in some cases. Therefore, in the conventional boot, in the case where the plunging constant velocity universal joint forms a high operating angle, the root portion on the side which is closest to the large diameter portion is caught between the outer joint member and the shaft, and the root portion on the side which is closest to the large diameter portion is more liable to be damaged when compared with that of the fixed-type constant velocity universal joint.

Meanwhile, in the boots 1, 1' according to the above-mentioned embodiments, even though a plunging constant velocity universal joint is used as the constant velocity universal joint 6, even when the boots 1, 1' are subjected to the axial force so as to be compressed and deformed, the deformation of the periphery of the root portion 13 is suppressed. As a result, the root portion 13 is prevented from being moved inside the outer joint member 7, and further, even in the case where the constant velocity universal joint 6 forms an operating angle, the root portion 13 is prevented from being caught between the outer joint member 7 and the shaft 9. Accordingly, the root portion 13 is less liable to be damaged, and the durability of the boots 1, 1' is increased. That is, the present invention is suitable in the case where the constant velocity universal joint 6 is a plunging constant velocity universal joint, particularly, in the case of a double offset type plunging constant velocity universal joint.

However, the present invention is not limited thereto, but is applicable to other plunging constant velocity universal joints such as a tripod type and a cross groove type, and to fixed-type constant velocity universal joints such as a Rzeppa type, a Barfield type, and a undercut free type.

In addition to the above-mentioned embodiments, the present invention may be variously modified without departing from the technical concept.

The invention claimed is:

1. A boot for a constant velocity universal joint, comprising:
   a large diameter portion fitted to an outer joint member of a constant velocity universal joint including
      the outer joint member,
      an inner joint member, and
      a torque transmitting member interposed between the outer joint member and the inner joint member, for transmitting torque;
   a small diameter portion fitted to a shaft coupled to the inner joint member;
   a bellows portion connected to a side of the large diameter portion and a side of the small diameter portion, alternately including a peak portion and a root portion which respectively have a peak shape and a root shape radially outward, and forming a root portion on a side of the bellows portion which is closest to the large diameter portion; and
   a shoulder portion for connecting the large diameter portion and the root portion on the side of the bellows portion which is closest to the large diameter portion to each other,
   wherein, in a state where the boot is fitted to the constant velocity universal joint and the shaft at an operating angle of 0 degrees,
      a circular arc portion and a linear portion are formed over the shoulder portion and the root portion on the side of the bellows portion which is closest to the large diameter portion, the circular arc portion being adjacent to the large diameter portion and having an axial sectional shape protruding radially outward, the linear portion being adjacent to the circular arc portion and having a linear axial sectional shape, and
      an inner peripheral surface of the linear portion is in contact with an opening end portion of the outer joint member, and a thickness from the circular arc portion to the linear portion is uniform,
   wherein, in a state where the boot is fitted to the constant velocity universal joint and the shaft at an operating angle of 0 degrees and the boot is subjected to an axial force so as to be compressed and deformed, the deformation of the periphery of the root portion on the side of the bellows portion which is closest to the large diameter portion is suppressed such that the root portion on the side of the bellows portion which is closest to the large diameter portion is prevented from being moved inside the outer joint member, wherein the axial sectional shape of the circular arc portion is formed into a semicircular arc shape protruding radially outward, wherein a thermoplastic polyester elastomer is used as a material of the boot, and wherein the constant velocity universal joint is a plunging constant velocity universal joint.

2. A boot for a constant velocity universal joint according to claim 1, wherein a minimum inner diameter of the root portion on the side of the bellows portion which is closest to the larger diameter portion is set so as to fall within a range of from 93% to 100% with respect to a maximum diameter of a groove for keeping the torque transmitting member at an opening end of the outer joint member.

3. A boot for a constant velocity universal joint according to claim 2, wherein the inner peripheral surface of the linear portion is inclined with respect to a radial direction at an angle which is higher than 0 degrees and not more than 10 degrees.

4. A boot for a constant velocity universal joint according to claim 1, wherein the inner peripheral surface of the linear portion is inclined with respect to a radial direction at an angle which is higher than 0 degrees and not more than 10 degrees.

5. A boot for a constant velocity universal joint according to claim 1, wherein the plunging constant velocity universal joint is a double offset type constant velocity universal joint provided with the torque transmitting members, the number of which is three to ten.

* * * * *